US012075553B1

(12) United States Patent
Aldeeb et al.

(10) Patent No.: US 12,075,553 B1
(45) Date of Patent: Aug. 27, 2024

(54) MICROWAVE PLASMA TORCH AND METHOD OF USE THEREOF

(71) Applicants: Hossam Gaber, North York (CA); Janak H Handa, Toronto (CA)

(72) Inventors: Mustafa Abdalmejeed Mansour Aldeeb, Oshawa (CA); Hossam Gaber, North York (CA)

(73) Assignees: Hossam Gaber, North York (CA); Janak H. Handa, Toronto (CA)

( * ) Notice: Subject to any disclaimer, the term of this patent is extended or adjusted under 35 U.S.C. 154(b) by 0 days.

(21) Appl. No.: 18/218,082

(22) Filed: Jul. 4, 2023

(51) Int. Cl.
*H05H 1/30* (2006.01)

(52) U.S. Cl.
CPC .................................... *H05H 1/30* (2013.01)

(58) Field of Classification Search
CPC ........................................................ H05H 1/30
USPC ..................................................... 219/121.48
See application file for complete search history.

(56) References Cited

U.S. PATENT DOCUMENTS 6,620,394 B2 * 9/2003 Uhm ........................ H05H 1/30 423/240 R
10,167,556 B2 * 1/2019 Ruzic ...................... C23C 14/32
2006/0081565 A1 * 4/2006 Lee .......................... H05H 1/46 219/121.43
2012/0217875 A1 * 8/2012 Park ......................... H05H 1/46 315/111.21
2018/0342379 A1 * 11/2018 Jurczyk ............. H01J 37/32449

* cited by examiner

*Primary Examiner* — Nathaniel E Wiehe
*Assistant Examiner* — Ket D Dang
(74) *Attorney, Agent, or Firm* — Aird & McBurney LP

(57) ABSTRACT

A microwave plasma torch and a method of use thereof is provided. The microwave plasma torch includes a torch housing, a microwave generator, at least one conductive rod, and a waveguide housing. The torch housing includes an outlet and at least one inlet that is positioned for injecting at least one plasma-forming gas. The conical chamber section within the torch chamber is shaped to accelerate the flow of the plasma-forming gas and produce a vortex flow pattern. The microwave generator produces a microwave signal and an electromagnetic field which is directed to the torch chamber by the waveguide housing. The at least one conductive rod is energized for applying a charge to the plasma-forming gas and generating a plurality of plasma streamers. The generated plasma streamers further ionize the plasma-forming gas to generate a plasma stream.

21 Claims, 15 Drawing Sheets

MICROWAVE PLASMA TORCH AND METHOD OF USE THEREOF

FIELD OF THE DISCLOSURE

The present disclosure relates generally to plasma generation systems. In particular, the disclosure relates to a microwave plasma torch and a method of use thereof.

BACKGROUND OF THE DISCLOSURE

In a microwave plasma system, the electromagnetic wave is generated by the magnetron with high frequency and transferred to the quartz tube (discharge chamber) by the waveguide. The electric field causes acceleration of the electrons and generates a plasma discharge inside the quartz tube. The magnetic field creates the motion of the electrons inside the plasma helically, which is suitable where the loss of the electrons will be the minimum. The electromagnetic wave does not disperse inside the plasma volume; it only diffuses for a small distance from the surface, i.e., the current passing through the surface of the plasma; this is called skin depth, and the thickness of the skin depth is inversely proportional to the frequency of the source.

The gas breakdown depends on the working pressure in the AC plasma discharge. In the case of atmospheric plasma discharge, a high electric field is needed to start the gas discharge. The mean free path of the electrons that starts the discharge is small, and the electrons cannot gain enough energy from the electric field to ionize the gas atoms/molecules. In the microwave plasma discharge, Because of the high mobility of the electrons, they can flow the electric field, while the ions do not move and do not involve in the plasma discharge. So, reducing the loss of electrons from the plasma during the discharge is essential to keep the plasma working.

While microwave plasma systems are well established, there are several existing issues with these conventional microwave plasma systems.

Conventional microwave plasma torches still need to be developed due to some problems using them broadly in pyrolysis, such as complex torch designs, high capital cost, limited gas compatibility and limited heat flux. Regarding the limitation of design complexity, existing microwave plasma torches require a complex design, including waveguides, tuners, ignition systems, circulators, which can be challenging to manufacture and maintain. Regarding the limitation of design high capital cost, the equipment required for generating and controlling microwave plasma via a microwave plasma torch is expensive, which can be a significant barrier to the widespread adoption of these torches. Regarding the limitation of limited gas compatibility, traditional microwave plasma torches are limited in terms of gas compatibility since only a few gases can be ionized using microwaves. Lastly, regarding the limitation of limited heat flux, traditional microwave plasma torches generate low heat flux due to the difficulty of sustaining the plasma efficiently at high gas flow rates, which can limit their use in plasma pyrolysis. Furthermore, conventional systems with DC circuits have to spend extra power to run the circuit, making the system less efficient. Unlike conventional microwave plasma systems, the microwave plasma troch as disclosed herein has a high-power efficiency, is simple to ignite and control, is low cost, generates high heat flux, and can work with different gases.

SUMMARY OF THE DISCLOSURE

According to an aspect, there is provided a microwave plasma torch comprising a torch housing that defines a torch chamber therewithin, and that includes an outlet and at least one inlet that is positioned for injecting at least one plasma-forming gas along an inner wall of the torch chamber, the torch chamber including at least one cylindrical chamber section and a conical chamber section extending between the at least one cylindrical chamber section and the outlet plasma-forming, and the conical chamber section being shaped to accelerate the flow of the at least one plasma-forming gas along a length thereof for producing a vortex flow pattern of the at least one plasma-forming gas within the torch chamber, a microwave generator for generating a microwave signal and a high frequency electromagnetic wave having a frequency of approximately 2.46 GHZ, at least one conductive rod that is disposed within the torch chamber, and a waveguide housing including a first waveguide end that is connected to the microwave generator and a second waveguide end that is connected to the torch housing, the waveguide housing being shaped to direct the electromagnetic wave and the microwave signal from the microwave generator to the torch chamber for energizing the at least one conductive rod, wherein the at least one conductive rod is energized for applying a charge to the at least one plasma-forming gas for generating a plurality of plasma streamers there from, and wherein the plurality of plasma streamers generated from the at least one plasma-forming gas further ionize the at least one plasma-forming gas to generate a plasma stream therefrom.

According to another aspect, there is provided a microwave plasma torch comprising a torch housing that defines a torch chamber therewithin, and that includes at least one gas inlet for the injection of at least one plasma-forming gas and an outlet for expelling a plasma stream generated from the at least one plasma-forming gas; a conductive rod that is mounted within the torch chamber such that a tip of the conductive rod is disposed within a discharge portion of the torch chamber, a microwave generator for generating an electromagnetic field and a microwave signal, and a waveguide housing including a first waveguide end that is connected to the microwave generator and a second waveguide end which surrounds a length of the torch housing that includes the discharge portion of the torch chamber, the waveguide housing being shaped to direct the electromagnetic wave and the microwave signal from the microwave generator to the torch chamber within the torch housing for energizing the at least one conductive rod, wherein the energizing of the at least one conductive rod ionizes the at least one plasma-forming gas to drive the formation of a plurality of plasma streamers within the torch chamber, wherein the plurality of plasma streamers further ionize the at least one plasma-forming gas to generate a flow of plasma therefrom.

According to yet another aspect, there is provided a method for generating a plasma flow within a microwave plasma torch, the method comprising injecting at least one plasma-forming gas into a torch chamber of the microwave plasma torch such that a vortex flow of the at least one plasma-forming gas is produced within the torch chamber, the at least one plasma-forming gas being injected at a first flow rate, energizing at least one conductive rod that is mounted within the torch chamber for generating a plurality of plasma streamers, the at least one conductive rod being energized for at least partially ionizing the at least one plasma-forming gas, and injecting the at least one plasma-forming gas into the torch chamber at a second flow rate that is greater than the first flow rate, the injection of the at least one plasma-forming gas at the second flow rate driving the formation of the plasma stream from the at least one plasma-forming gas and the plurality of plasma streamers.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1A:
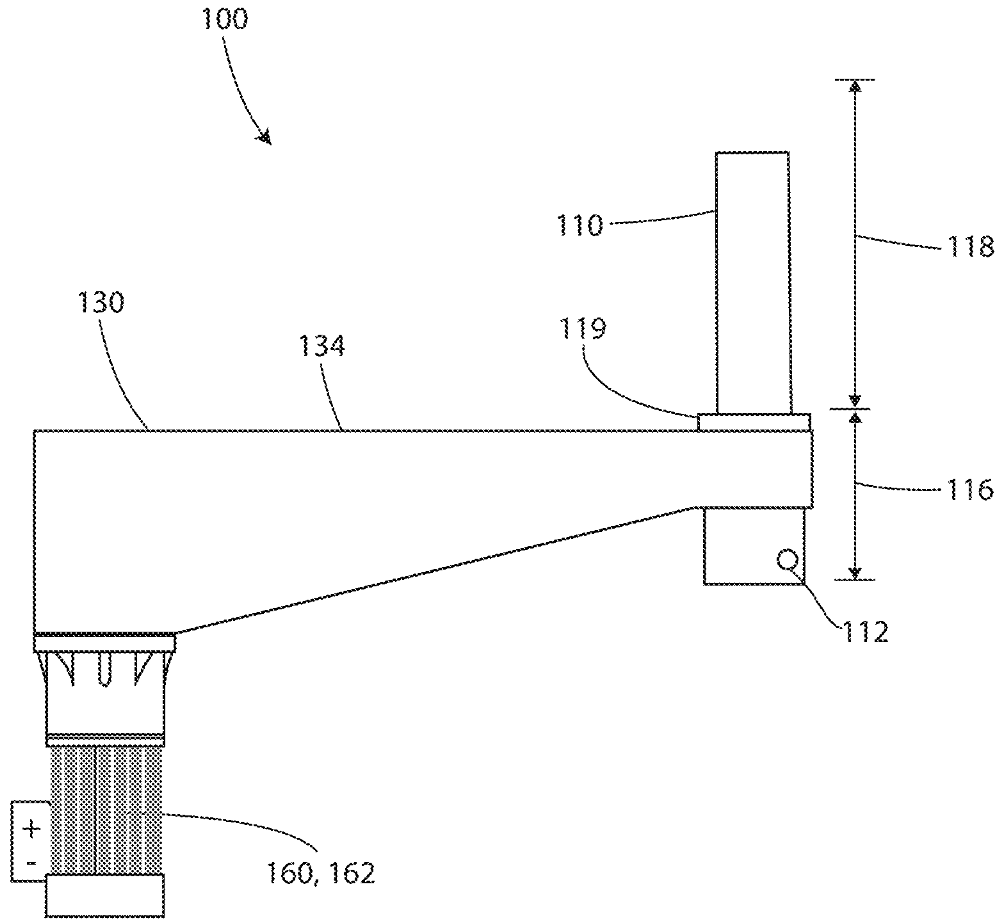
FIG. 1A shows a side-view of a first embodiment of the microwave plasma torch.

For simplicity and clarity of illustration, where considered appropriate, reference numerals may be repeated among the Figures to indicate corresponding or analogous elements. In addition, numerous specific details are set forth to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" or "an" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The embodiments of the present disclosure are exemplary (e.g., in terms of materials, shapes, dimensions, and constructional details) and do not limit by the claims appended hereto and any amendments made thereto. Persons skilled in the art will appreciate that there are yet more alternative implementations and modifications possible, and that the following examples are only illustrations of one or more implementations. The scope of the invention, therefore, is only to be limited by the claims appended hereto and any amendments made thereto.

According to an embodiment of the present disclosure, there is provided a method for generating a gas flow pattern within the plasma chamber, where the gas flow pattern is a vortex flow pattern. The method comprises injecting at least one plasma-forming gas into the plasma chamber of the microwave torch, initially at a low flow rate, to allow the igniter to start the formation of the plurality of plasma streamers. The method also comprises injecting the at least one plasma-forming gas at a gradually increasing flow rate thereafter, where the gradually increasing flow rate causes the volume of plasma to increase such that the volume of plasma substantially fills the whole plasma chamber. During the increase of the flow rate of the at least one plasma-forming gas, the velocity of the at least one plasma-forming gas increases. Because of the cyclone separator shape, a vortex flow pattern develops and confines the plasma and separates it from the wall, which reduces the loss in the plasma charges and hence the electric power.

Figure 1B:
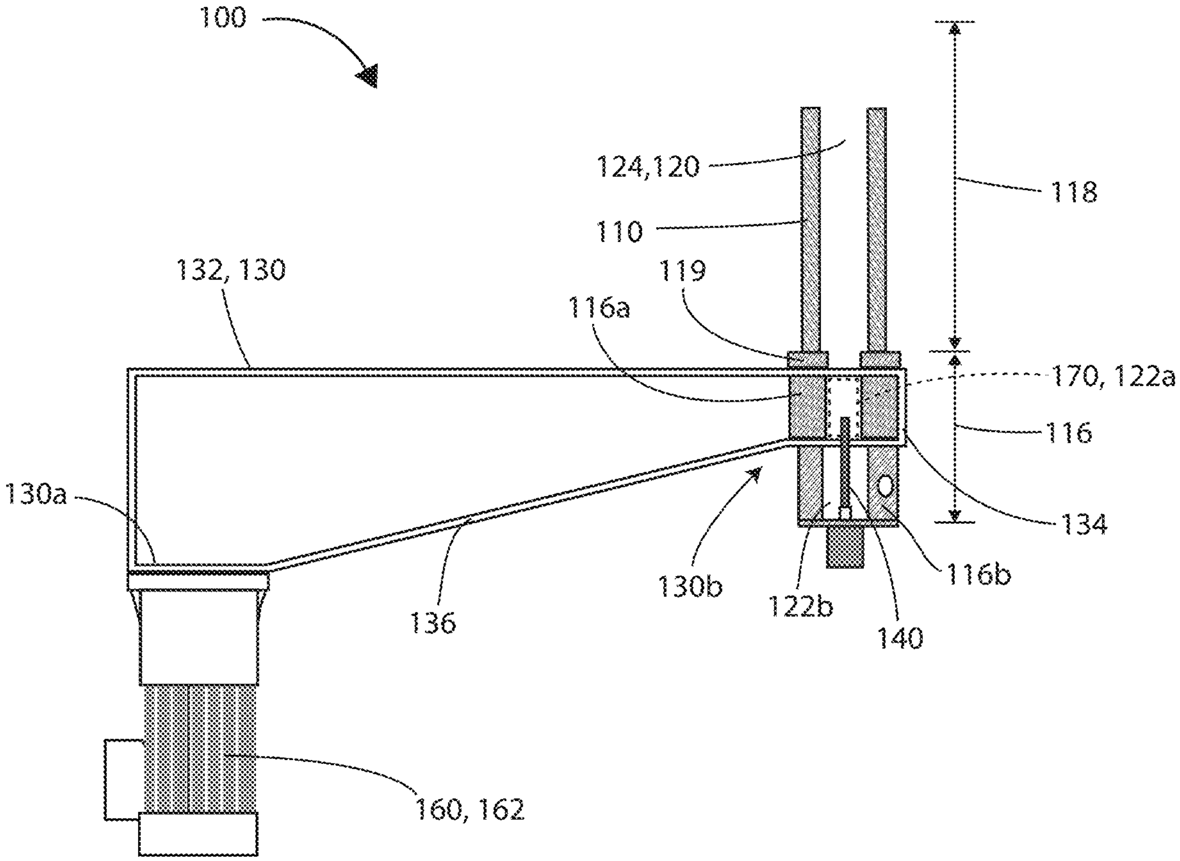
FIG. 1B shows a section view of the embodiment of the microwave plasma torch of FIG. 1A.

Referring to FIGS. 1A and 1B, there is provided an embodiment of the microwave plasma torch 100 of the present disclosure. In this embodiment, the microwave plasma torch 100 includes a torch housing 110 that defines a torch chamber 120 therewithin, and that includes at least one gas inlet 112 for the injection of at least one plasma-forming gas. The microwave plasma torch 100 also includes at least one conductive rod 140 that is mounted within the torch chamber 120 such that a tip 142 of the at least one conductive rod 140 is disposed within a discharge portion 170 of the torch chamber 120. Lastly, the microwave plasma torch 100 includes a microwave generator 160 for generating an electromagnetic field and a microwave signal, and a waveguide housing 130 with a first waveguide end 130*a* that is connected to the microwave generator 160 and a second waveguide end 130*b* which surrounds a length 110*a* of the torch housing 110, where this length 110*a* of the torch housing 110 includes the discharge portion 170 of the torch chamber 120. The waveguide housing 130 of the microwave plasma torch 100 is generally shaped to direct the electromagnetic field and the microwave signal from the microwave generator 160 to the torch chamber 120 within the torch housing 110 for energizing the at least one conductive rod 140.

In an additional embodiment, the microwave plasma torch 100 also includes an outlet for expelling a flow of plasma generated from the at least one plasma-forming gas from within the microwave plasma torch 100.

In the functioning of the microwave plasma torch 100 for producing a flow of plasma, the energizing of the at least one conductive rod 140 via the electromagnetic field and the microwave signal will in turn drive the ionization of the at least one plasma-forming gas and the formation of a plurality of plasma streamers 180 within the torch chamber 120, where the plurality of plasma streamers 180 further ionize the at least one plasma-forming gas to generate a flow of plasma therefrom.

In an embodiment, the electromagnetic field generated by microwave generator 160 includes an electric field component and a magnet field component.

In an embodiment, the microwave generator 160 is a magnetron 162 that is mounted against the opening of the first end 130*a* of the waveguide housing 130. As is known in the art, a magnetron 162 is a device that generates a microwave signal and will produce a crossed magnetic and electric field. The magnetron 162 generates the microwave signal and is responsible for the microwave output power. To generate the microwave signals, a high DC current (i.e., several amperes) is applied on a filament (not shown) in the magnetron 162. In the embodiments of the present disclosure where the microwave generator 160 is the magnetron 162, the electromagnetic field includes the electric field component and magnetic field component in the form of the crossed magnetic and electric fields from the magnetron 162.

In an exemplary embodiment, the structure of the magnetron 162 includes a magnetron 162 housing and a substantially cylindrical anode which is supported within an evacuation chamber by a filament. The cylindrical anode is provided with a plurality of apertures, and a cylindrical cathode is mounted concentrically within the cylindrical anode. A cylindrical magnetic field is applied to the assembly and electrons emitted from the cylindrical cathode are accelerated towards the cylindrical anode under the influence of the electric field (of the electromagnetic field) between the cathode and the anode. The magnetic field component causes the electrons to spiral around the anode, passing through the apertures in the anode. When the electrons pass through the apertures, microwave radiation is generated. The electric field component of the microwaves is perpendicular to the magnetic field component, creating a crossed magnetic and electric field (electromagnetic field). In operation, the magnetron 162 will generate microwave signals when the electrons are accelerated and pass through the apertures in the cylindrical anode. The microwave signals generated by the magnetron 162 have a frequency that is set by the magnetic field strength and the spacing between the cathode and the anode of the magnetron 162.

In an additional embodiment, the microwave generator 160 is a magnetron 162, and the driven power applied to the magnetron 162 is 1.1 KW.

In an alternate embodiment, the microwave generator 160 is a solid-state power amplifier (SSPA).

In an embodiment, the microwave generator 160 includes a second end 130*b* that is connected to the first end 130*a* of the waveguide housing 130, where the microwave signals and electromagnetic field produced within the microwave generator 160 will be emitted through the second end 130*b* of the microwave generator 160.

As provided above, the microwave plasma torch 100 includes a waveguide housing 130 that extends between the microwave generator 160 and the length 110*a* of the torch housing 110. The waveguide housing 130 is formed as a material with a low bulk resistivity and relatively low conductivity characteristics such that the waveguide housing 130 can guide the electromagnetic field towards the torch housing 110 while substantially maintaining a field strength of the electromagnetic field. The waveguide housing 130 will substantially maintain the field strength based on the inverse square law property of electromagnetic field, where a field's strength or intensity is equal to the inverse of the square of the distance from the source of the electromagnetic field. By providing a waveguide housing 130 that restricts the extent to which the electromagnetic field can expand relative to its source (the microwave generator 160) the waveguide housing 130 works to maintain a minimum field strength of the electric field component and magnetic field components of the electromagnetic field.

In an embodiment, the waveguide housing 130 is composed of at least one of a plastic material, a metal material with a low bulk resistivity, and a metal material with low conductivity characteristics.

In the specific embodiment provided in FIGS. 1A to 5, the waveguide housing 130 has a prismatic form, and includes a flat top wall 132, four side walls 134 and a partly angled bottom wall 136. The first end 130*a* of the waveguide housing 130 is defined along a first flat section of the partly angled bottom wall 136. A second end 130*b* of the waveguide housing 130 is defined by a pair of apertures 238 (shown in FIGS. 3 and 4), where one of the pair of apertures 238 is formed proximate a second end 130*b* of the flat top wall 132, and where the second one of the pair of apertures 238 is formed in a second flat section of the partly angled bottom wall 136. The pair of apertures 238 collectively define a through channel 240 of the waveguide housing 130, and the torch housing 110 is mounted to the through channel 240 of the waveguide housing 130.

Referring to FIGS. 1A and 1B, the torch housing 110 is mounted within the through channel 240 in the second end 130*b* of the waveguide housing 130. The torch housing 110 includes the torch chamber 120 mounted therewithin, and the torch chamber 120 includes a lower chamber section 124 and an upper chamber section 122.

The lower chamber section 124 defines a region of the torch chamber 120 in which the flow of plasma become fully formed and develops a plasma flow pattern that is generated based on a gas flow pattern of the at least one plasma-forming gas in the torch chamber 120.

The upper chamber section 122 defines a region of the torch chamber 120 into which the at least one plasma-forming gas is injected, and in which the at least one conductive rod 140 is mounted. As such, the upper chamber section 122 also defines the region of the torch chamber 120 in which the plurality of plasma streamers 180 are first generated (the discharge portion 170).

In an embodiment, the upper chamber section 122 includes a first upper section 122*a*, and a second upper section 122*b* that is adjacent to the first upper section 122*a*, and which is defined within the waveguide housing 130.

As shown in FIGS. 1A and 1B, the torch housing 110 includes a lower housing section 118 that contains the lower chamber section 124 therewithin, and an upper housing section 116 that contains the at least one upper chamber section 122 therewithin.

In the specific embodiment provided in FIGS. 1A and 1B, the lower housing section 118 includes a lower housing body 118*a*, a mounting plate 119 on which a first end of the lower housing body 118*a* is fixedly mounted (such as through a welded connection). The upper housing section 116 includes a first upper housing length 116*a* that surrounds and defines the first upper section 122*a* and a second upper housing length 116*b* that surrounds and defines the second upper section 122*b*. The first upper housing length 116*a* is mounted to the waveguide housing 130 and includes an end plate fixed to a bottom end of the first upper housing length 116*a*. The conductive rod 140 is mounted to the end plate, and the at least one gas inlet 112 is formed though the first upper housing length 116*a*. The second upper housing length 116*b* is mounted within the waveguide housing 130 and defines the discharge portion 170 within the torch chamber 120.

In an embodiment, the torch housing 110 is at least partially composed of at least one dielectric material such as quartz.

In an additional embodiment, the lower housing body 118*a* of the lower housing section 118 in the torch housing 110 is entirely composed of quartz.

In an alternate embodiment, an inner wall of the torch housing 110 that defines an outermost extend of the torch chamber 120 has a layer of at least one dielectric material mounted thereon such that the inner wall is a dielectric inner wall.

In an embodiment, the gas flow pattern of the at least one plasma-forming gas within the torch chamber 120 is a vortex flow pattern. It is known within the art of microwave plasma torches to provide torches with vortex flow patterns. Providing the at least one plasma-forming gas in a vortex flow pattern within the torch chamber 120 will decrease the loss of highly energized electrons from the flow of plasma by initiating and maintaining a layer of cold at least one plasma-forming gas between the flow of plasma and the inner walls of the torch chamber 120.

In an embodiment, the at least one gas inlet 112 is formed in the torch housing 110 such that the at least one plasma-forming gas is injected along an inner wall of the torch chamber 120. By injecting the at least one plasma-forming gas along an inner wall of the torch chamber 120, the gas flow pattern of the at least one plasma-forming gas will more readily form in the aforementioned vortex flow pattern.

In an additional embodiment, the at least one gas inlet 112 is formed such that the at least one plasma-forming gas is injected substantially tangential to the inner wall of the torch chamber 120.

In yet another embodiment, the inner wall of the torch chamber 120 along which the at least one plasma-forming gas is injected is an inner wall that surrounds the discharge portion 170 of the torch chamber 120.

As shown in FIGS. 1A to 4, the microwave plasma torch 100 includes the at least one conductive rod 140, where the at least one conductive rod 140 functions as the igniter within the microwave plasma torch 100. The at least one conductive rod 140 provides a means of ionizing the at least one plasma-forming gas without requiring an external power supply to be connected to the igniter. Ignition circuits in conventional microwave plasma systems require an external DC circuit to power the igniter. By providing an igniter, in the form of the at least one conductive rod 140, that does not require an external DC circuit to function, the microwave plasma torch 100 as disclosed herein has lower power requirements that conventional microwave plasma torches, while still produce high-temperature flows of plasma.

The at least one conductive rod 140 is mounted within the torch chamber 120 of the microwave plasma torch 100 for igniting the at least one plasma-forming gas using the electromagnetic field produced by the magnetron 162. The ignition of the at least one plasma-forming gas via the at least one conductive rod 140 drives an ionization of the at least one plasma-forming gas to produce the aforementioned plurality of plasma streamers 180. The plurality of plasma streamers 180 as described herein are fast-moving ionization fronts of the at least one plasma-forming gas that extend from the conductive rod 140 and can take on various forms or complicated tree-like structures. The plurality of plasma streamers 180 will each arc between the tip 142 of the at least one conductive rod 140 and an inner wall of the torch chamber 120, where the distance between the rod and the inner wall of the torch chamber 120 defines a torch gap.

In an embodiment, the plurality of plasma streamers 180 are generated by mounting the at least one conductive rod 140 within the torch chamber 120 such that it is within the path of the electric field component of the electromagnetic field that is directed to the torch chamber 120 via the waveguide housing 130. By placing the at least one conductive rod 140 within the path of the electric field, a substantial build-up of surface charge will develop on the tip 142 of the at least one conductive rod 140. The build-up of charge on the tip 142 of the rod will produce significant field augmentation zones of the electric field in the vicinity of the tip 142 of the at least one conductive rod 140, where the field strength of the electric field in these field augmentations zones will be substantially higher that a background field strength of the electric field component of the electromagnetic field. The plurality of plasma streamers 180 will form when the field strength of the electric field in these augmented field zones is greater than a breakdown field strength of the at least one plasma-forming gas.

When the electric field strength of the augmented field zones is higher than the breakdown field of the at least one plasma-forming gas, the electrons of the at least one plasma-forming gas will be excited to a degree such that the collision frequency of the electrons in the at least one plasma-forming gas matches the collision frequency of the electrons inside the existing flow of plasma/plasma streamers, thereby ensuring that the plasma is sustained after it starts.

In an embodiment, the at least one conductive rod 140 is positioned within the torch chamber 120 for inducing the formation of at least one augmented field zone within the electric field component of the electromagnetic field. In this embodiment, a field strength of the electric field in the at least one augmented field zone is greater than a breakdown field strength of the at least one plasma-forming gas. And each streams of the plurality of plasma streamers 180 contains "highly energetic electrons (>10 eV).

As described previously, the plurality of plasma streamers 180 will further ionize the at least one plasma-forming gas for generating the flow of plasma within the torch chamber 120.

In some embodiments, this further ionization of the at least one plasma-forming gas via the plurality of plasma streamers 180 not only ignites the plasma, but also works as a source of high energy electrons that increase the ionization degree of the flow of plasma. By increasing the ionization degree of the plasma, the resistivity of the plasma is decreased, thereby reducing the reflected power and the loss of the electrons from the flow of plasma.

In an embodiment, the at least one conductive rod 140 is mounted in the torch housing 110 such that a long axis of the at least one conductive rod 140 is aligned to be substantially parallel to the electric field component of the electromagnetic field within the torch chamber 120.

In an additional embodiment where the at least one conductive rod 140 includes the tip 142, the at least conductive rod 140 is mounted within the torch chamber 120 of the torch housing 110 such that the tip 142 of the conductive rod 140 is disposed in the discharge portion 170 of the upper chamber section 122 of the torch chamber 120.

In an additional embodiment, the at least one conductive rod 140 is formed as at least one metallic rod that is composed of at least one metal element.

In an exemplary embodiment of the at least one conductive rod 140, the at least one conductive rod 140 is composed of four tungsten (such as those sold commercially for welding). Two of the four tungsten rods have a diameter of 2 mm and a length of 5 cm, and two of the four tungsten rods have diameters of 1.5 mm and a length of 2 cm. The four tungsten rods collectively form the igniter. To ignite the ignite and produce the plurality of plasma streamers 180, a maximum microwave (1.1 KW) power is applied to the magnetron 162 and the microwave signal and electromagnetic field charge and energy the tips of the four tungsten rods to produce the aforementioned augmented field zones therearound.

Figure 8:
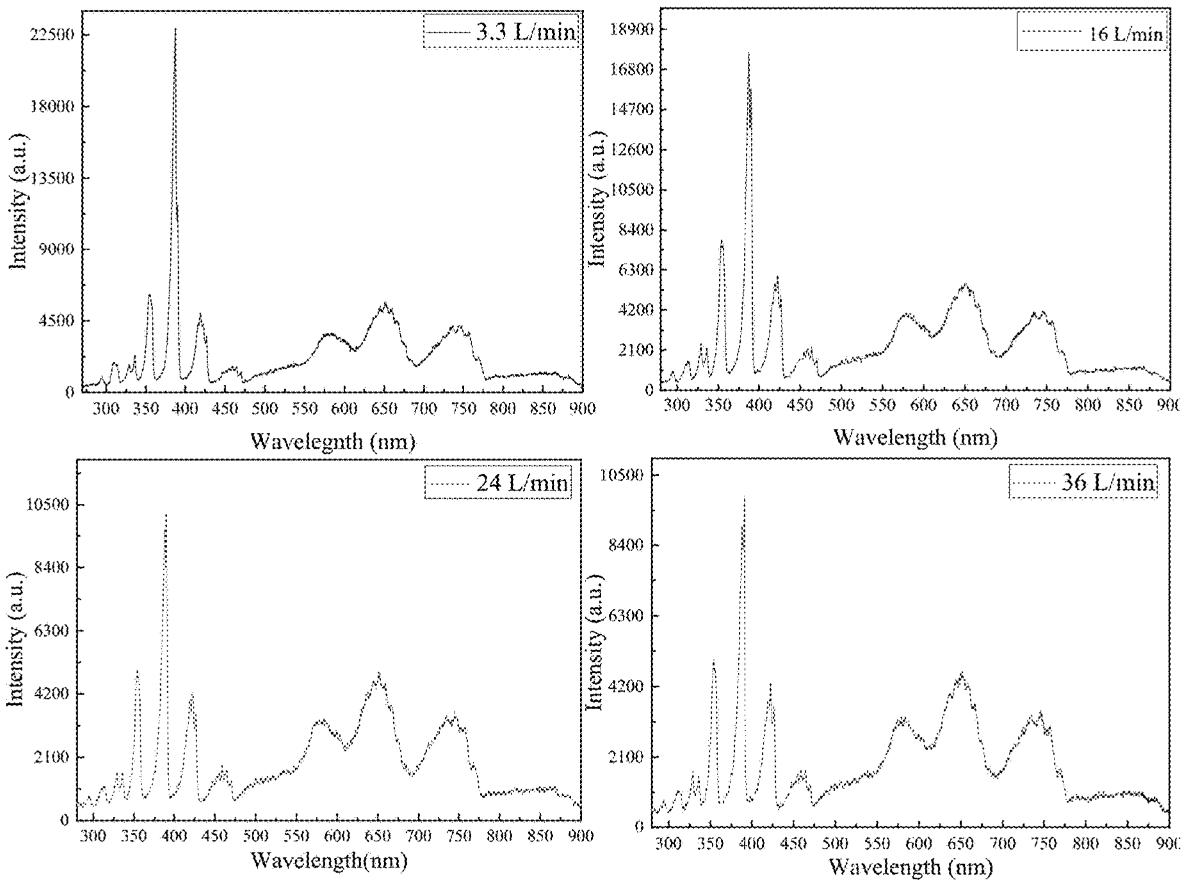
FIG. 8 is a series of a spectral plots of the flow of plasma produced by the microwave plasma torch.

In an additional embodiment, the aforementioned augmented field zones at the tip 142 of the at least one conductive rod 140 will precipitate the formation of a cloud of ions that surround the tip 142. The cloud of ions will shield and protect the conductive rod 140 form the surrounding flow of plasma, thereby prevent the rod from melting under the influence of the plasma. The formation of the cloud of ions and the protection of the conductive rod 140 is demonstrated by the plots provided in FIG. 8. These plots show spectrums of the flow of plasma from the microwave plasma torch 100, where the torch 100 includes the aforementioned four tungsten rods, and the at least one plasma-forming gas is nitrogen. The plots in FIG. 8 show the spectrum of the flow of plasma at four different flow rates: 3.3, 16, 24, and 36 SLPM (standard liter per minute). At all four of these flow rates, the plot lines of FIG. 8 contain several bands belonging to working at least one plasma-forming gas (nitrogen) and contain no lines belonging to any of the component metals (tungsten) found within the conductive rod 140. The absence of any spectra associated with the component metals of the conductive rod demonstrates the protection of the conductive rod 140 from the influence of the flow of plasma within the torch chamber 120 via the cloud of ions.

As provided above, the electromagnetic field generated by the microwave generator includes the electric field component and the magnet field component. The magnetic field component and electric field component collectively act on the electrons within the at least one plasma-forming gas in generating the flow of plasma.

The magnetic field component of the electromagnetic field functions to induce a helical motion of the electrons of the at least one plasma-forming gas within the discharge portion 170 of the torch chamber 120. This helical motion will be maintained as the at least one plasma-forming gas becomes ionized in forming both the plurality of plasma streamers 180 and the flow of plasma inside the torch chamber 120.

The electric field component of the electromagnetic field will (charge the rod) and will drive an acceleration of the electrons of the at least one plasma-forming gas within the discharge portion 170 of the torch chamber 120 for generating the highly energetic electrons. As provided above, the highly energetic electrons are responsible for the generation of the plurality of plasma streamers 180 from the at least one conductive rod 140.

In an additional embodiment, an electric field strength of electric field component of the electromagnetic field is greater than a breakdown field strength of the at least one gas that constitutes the at least one plasma-forming gas. The electric field is provided with a field strength that exceeds breakdown strength of the at least one plasma forming gas such that the electric field can excite the electrons in the at least one plasma-forming gas to match the collision frequency of the electrons inside the flow of plasma, thereby ensure the flow of plasma within the torch chamber 120 is sustained after it starts.

In the microwave plasma torch 100 as disclosed herein, the electromagnetic field generated by the microwave generator does not disperse into the volume of the flow of plasma. The electromagnetic field will only diffuse or propagate for a small distance from a surface at the start of the flow of plasma (i.e., the start of the current that is passing through the surface of the plasma). The depth to which the electromagnetic field will diffuse into the flow of plasma is known as the skin depth. In the microwave plasma torch 100 as disclosed herein, the thickness of the skin depth is proportional to the frequency of the electromagnetic field generated by the microwave generator (i.e., the source frequency). The limited penetration of the electromagnetic field into the plasma occurs because the microwave plasma torch 100, 200 as disclosed herein does not include a tuner. Due to this limited penetration, it is the electrons excited by the electromagnetic field and at least one conductive rod 140 that are primarily responsible for the power absorbed into the flow of plasma. The electrons take power from the electric field in the skin depth and collide with the neutrals inside the plasma to create more electrons, where this high the electrons concentration effectively increases the absorbed power of the flow of plasma.

As provided above, the gas flow pattern of the at least one plasma-forming gas within the torch chamber 120 can be provided as a vortex flow pattern in order to decrease the loss of highly energized electrons from the flow of plasma, by initiating and maintaining a cold layer of the at least one plasma-forming gas between the flow of plasma and the inner walls of the torch chamber 120. While it is known to provide the at least one plasma-forming gas in a vortex flow pattern within conventional microwave plasma torches, conventional torches suffer from limited efficiency when utilizing these vortex flow patterns. This limited efficiency is due to the fact that the microwave torches can only generate vortex flow patterns that will suitably prevent energized electron loss when the plasma forming gas is provided into the plasma torch at a high gas flow rate of above 13 SLPM. At low gas flow rates, which typically fall in a range from 6 to 13 SLPM, the plasma jet produced within the torch will have a low effective heating rate and a low thermal power that is insufficient to initiate and efficient plasma pyrolysis application.

In some embodiments of the microwave plasma torch 100 of the present disclosure, the torch housing 110 including the lower housing section 118 and upper housing section 116 are additionally structured so as to initiate a free vortex flow pattern of the at least one plasma-forming gas within the torch chamber 120 at relatively low flow rates of the at least one plasma-forming gas (where a low flow rate is defined herein as less than 6 SLPM).

Figure 2A:
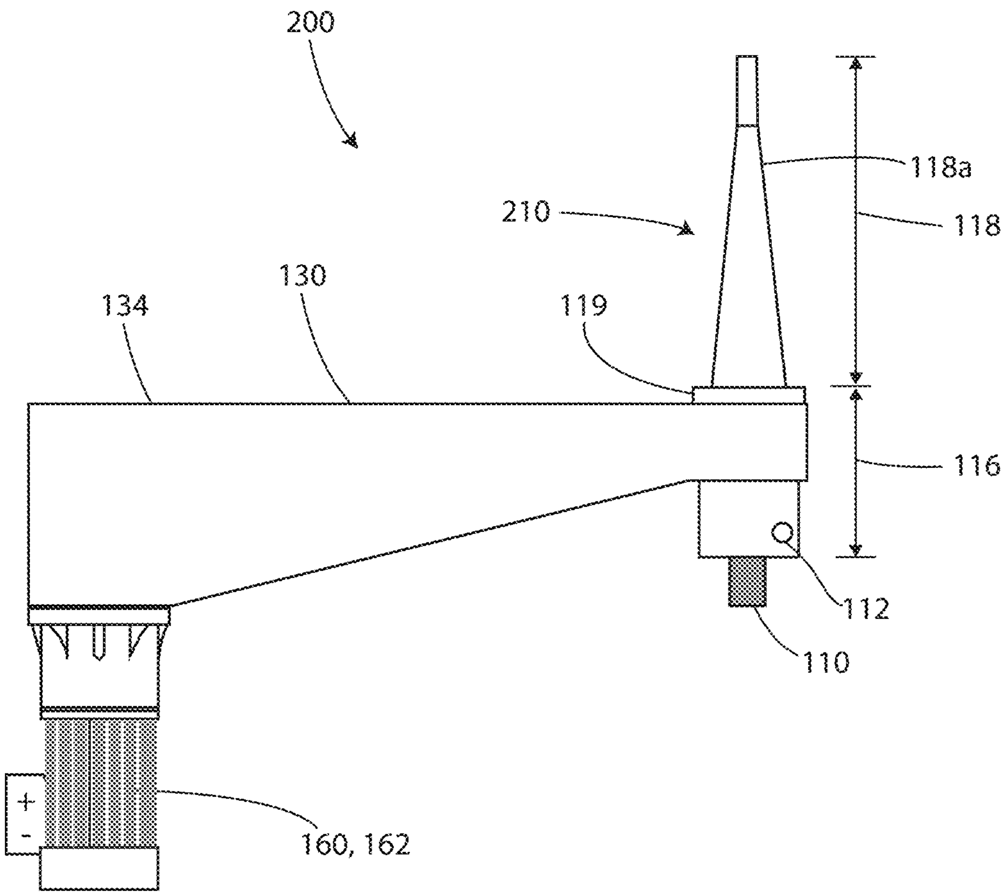
FIG. 2A shows a side-view of a second embodiment of the microwave plasma torch.
Figure 2B:
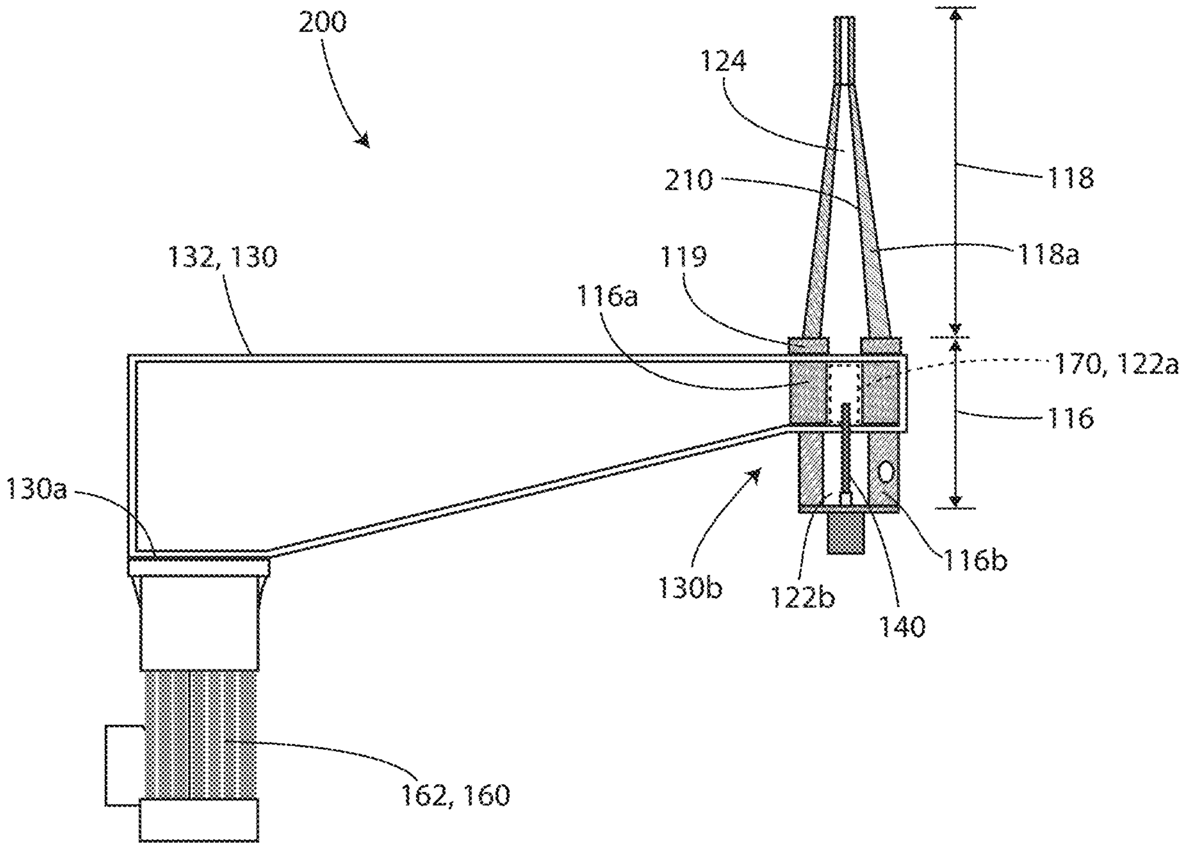
FIG. 2B shows a section view of the embodiment of the microwave plasma torch of FIG. 2A.

One such embodiment is provided in FIGS. 2A and 2B, where the plasma torch is a microwave plasma torch 200 that includes a torch housing 210 that defines a torch chamber 220 therewithin, and that includes the least one gas inlet 112 which is positioned for injecting the at least one plasma-forming gas along the inner wall of the torch chamber 220. The torch housing 210 and torch chamber 220 include all the aforementioned features of the torch housing 210 and torch chamber 220, respectively. However, the torch chamber 220 also includes at least one cylindrical chamber section 250 and a conical chamber section 252 extending between the at least one cylindrical chamber section 250 and the outlet of the microwave plasma torch 100, where the conical chamber section 252 is shaped to accelerate the flow of the at least one plasma-forming gas along a length thereof for producing a vortex flow pattern of the at least one plasma-forming gas within the torch chamber 220. In this embodiment, the upper chamber section 122 includes the at least one cylindrical chamber section 250 and the lower chamber section 124 includes the conical chamber section 252.

The microwave plasma torch 200 also includes the microwave generator 160 for generating the microwave signal and the electromagnetic field, the at least one conductive rod 140 that is disposed within the torch chamber 220, and the waveguide housing 130 that includes the first waveguide end that is connected to the microwave generator 160 and the second waveguide end that is connected to the torch housing 210. As with the microwave plasma torch 100, the waveguide housing 130 of the microwave plasma torch 200 is shaped to direct the electromagnetic field and the microwave signal from the microwave generator 160 to the torch chamber 220 for energizing the at least one conductive rod 140, where the at least one conductive rod 140 is energized for applying a charge to the at least one plasma-forming gas for generating a plurality of plasma streamers 180 from the tip 142 of the at least one conductive rod 140.

As is shown in FIGS. 2B, 3, 4, and 5, the at least one conductive rod 140 is positioned within the torch chamber 220 such that the tip 142 of the conductive rod 140 is disposed within the at least one cylindrical chamber section 250. In an additional embodiment such as shown in FIG. 2B, the at least one conductive rod 140 is concentrically mounted within the at least one cylindrical chamber section 250.

Referring to FIGS. 2B, 3, 4, and 5, the torch chamber 220 of the microwave plasma torch 200 includes the at least one cylindrical chamber section 250 and the conical chamber section 252 extending between the at least one cylindrical chamber section 250 and the outlet of the microwave plasma torch 100. The provision of the at least one cylindrical chamber section 250 and the conical chamber section 252 provides a means to transform the inertia force of gas-particle flows in the flow of at least one plasma-forming gas to a centrifugal force causing a vortex flow pattern of at least one plasma-forming gas (and of the flow of plasma) to develop therewithin. The conical chamber section 252 is shaped to accelerate the flow of the at least one plasma-forming gas along a length thereof for producing a vortex flow of the at least one plasma-forming gas within the torch chamber 220.

Figure 3:
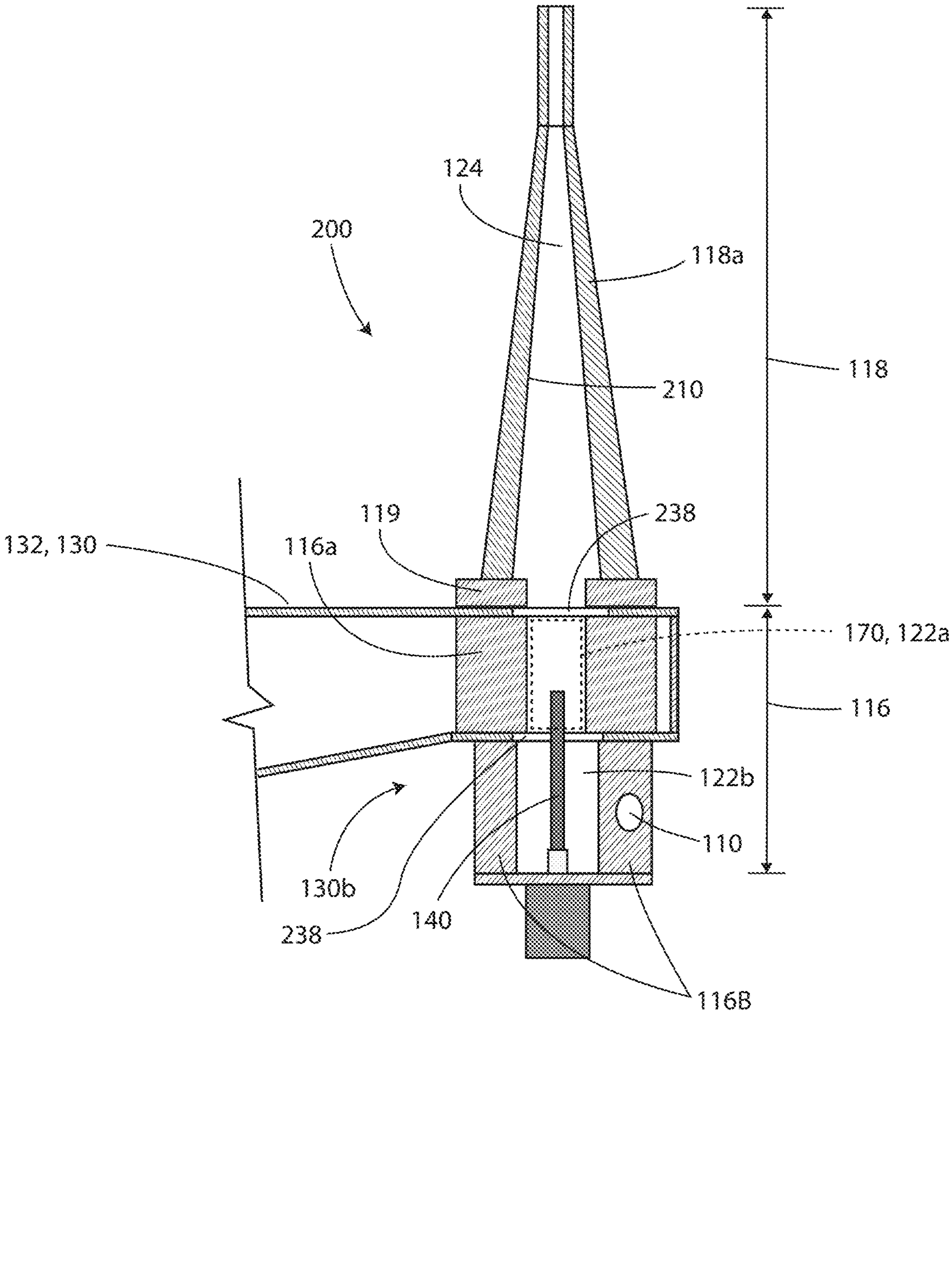
FIG. 3 shows a close-up, section view of the embodiment of the microwave plasma torch of FIG. 2A.
Figure 4:
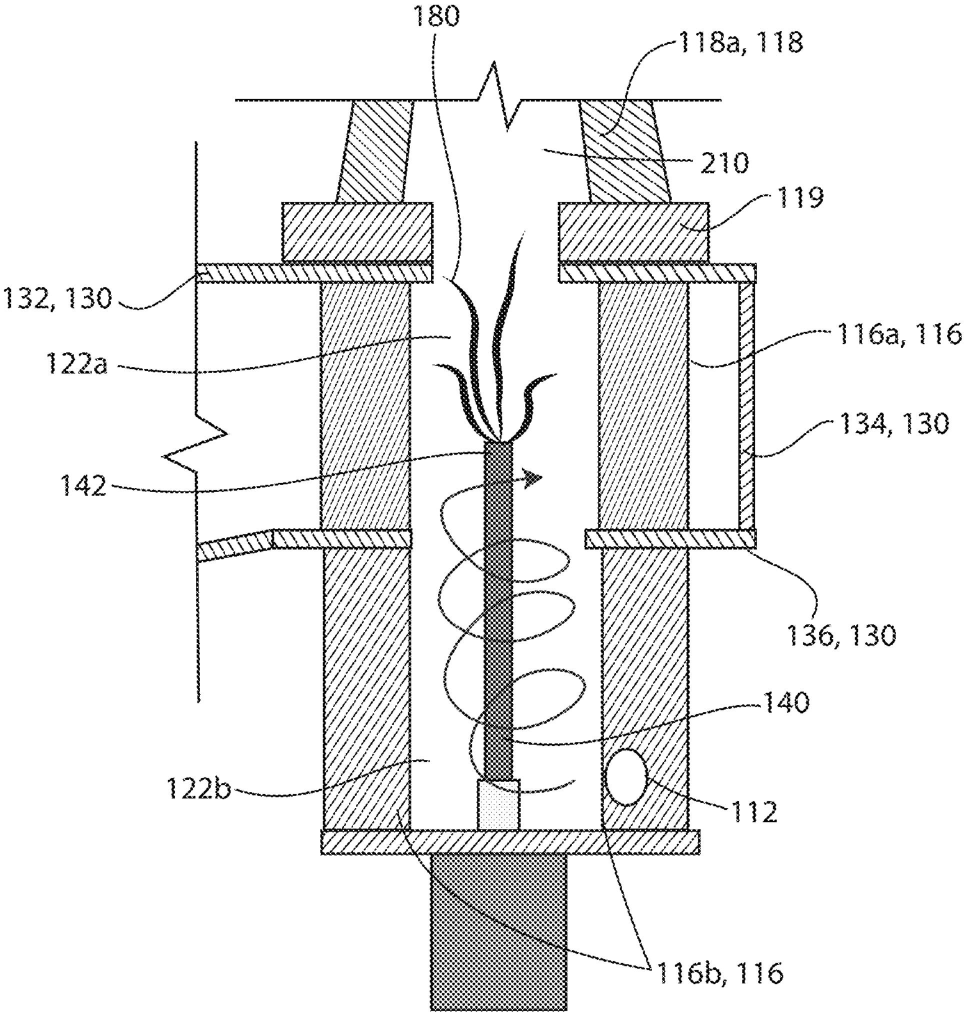
FIG. 4 shows a close-up, section view of the upper torch section of the embodiment of the microwave plasma torch of FIG. 2A.
Figure 5:
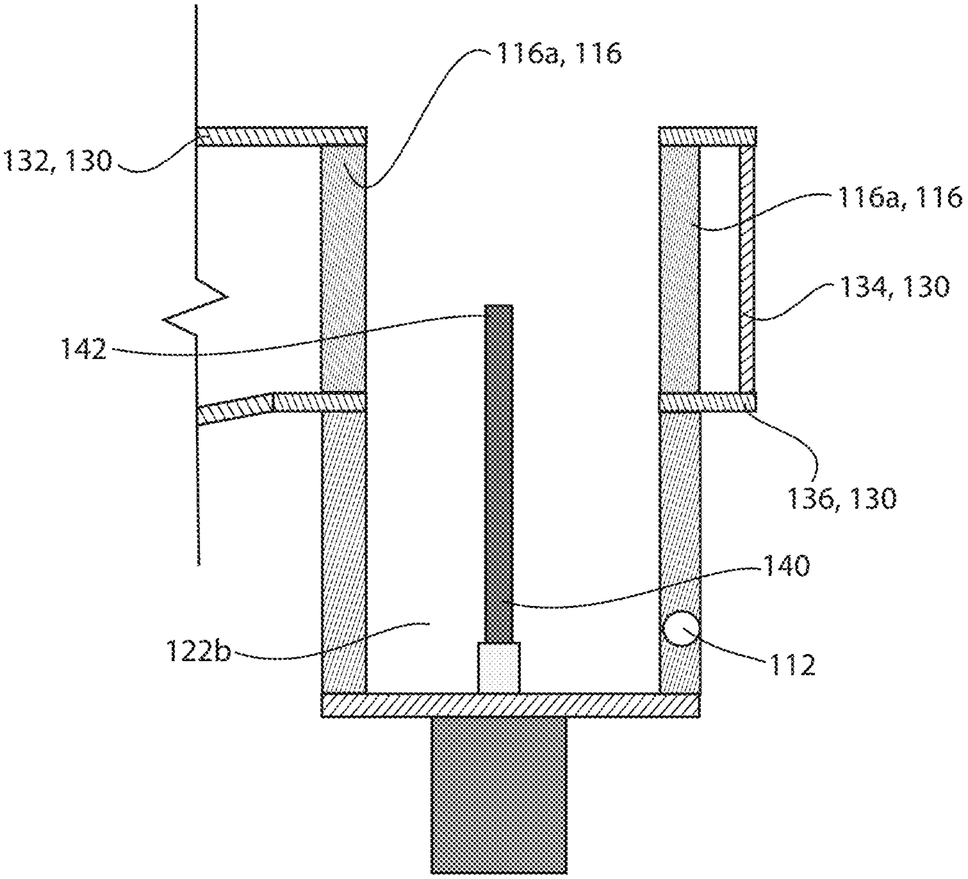
FIG. 5 shows an additional close-up, section view of the waveguide housing and lower housing section of the embodiment of the microwave plasma torch of FIG. 2A, where the upper housing section has been removed from the microwave plasma torch.

As shown in FIGS. 2B, 3, and 4, the conical chamber section 252 is specifically shaped with a taper such that a diameter of the conical chamber section 252 adjacent the at least one cylindrical chamber section 250 is greater than a diameter of the conical chamber section 252 adjacent the outlet of the microwave plasma torch 100. The tapering form of the conical chamber section 252 will cause the vortex flow pattern of the at least one plasma-forming gas to develop. The spiral, vortex flow pattern of the at least one plasma-forming gas that surrounds the plasma will compress the flow of plasma along the center of the torch chamber 220 and will thereby isolate the flow of plasma from the walls. This isolation of the plasma will reduce the loss of the electrons from the plasma, thereby increase the torch efficiency, and reducing the microwave power that is necessary to generate the flow of plasma at atmospheric or near atmospheric pressure. By reducing the required microwave power of the microwave generator 160, the system also generates less reflected power, negating the use of a tuner and a circulator in the microwave plasma torch.

In an embodiment, the lower housing body 118*a* of the lower housing section 118 is formed as a conical, hollow lower housing body 118*a*, where the conical chamber section 252 is defined within the hollow lower housing body 118*a*.

In the specific embodiment provided in FIGS. 2A, 2B, and 3, the hollow interior of the lower housing section 118 defines the conical chamber section 252 of the lower chamber section 124, and the lower housing section 118 also includes a straight tip that defines the outlet of the microwave plasma torch 100. The upper housing section 116 includes the first upper housing length 116*a* and the second upper housing length 116*b*, and the at least one cylindrical chamber section 250 includes a first cylindrical chamber section 250*a* that is defined within the first upper housing length 116*a*, and a second cylindrical chamber section 250*b* defined in the second upper housing length 116*b*. The discharge portion 170 of the upper chamber section 122 is defined in the second cylindrical chamber section 250*b*, and the at least one conductive rod 140 is positioned within the torch chamber 220 such that the tip 142 of the conductive rod 140 is disposed within discharge portion 170 (second cylindrical chamber section 250*b*).

In an additional embodiment such as shown in FIGS. 2B, 3 and 4, the second cylindrical chamber section 250*b* is disposed between the first cylindrical chamber section 250*a* and the conical chamber section 252, and a diameter of the first cylindrical chamber section 250*a* is less than a diameter of the second cylindrical chamber section 250*b*.

In yet another embodiment, the portion of the torch housing 210 that is surrounded by the second end 130*b* of the waveguide housing 130 is the second cylindrical chamber section 250*b*.

In an embodiment such as shown in FIG. 2B, the inner wall of the torch chamber 220 along which the at least one plasma-forming gas is injected is an inner wall of the at least one cylindrical chamber section 250.

In the specific embodiment provided in FIG. 2B, the at least one gas inlet 112 is formed in the first upper housing length 116*a* such that the gas particles of the at least one plasma forming gas enter tangentially along the top of the inner wall of the first cylindrical chamber section 250*a*, and travel downward into the second cylindrical chamber section 250*b* and then into the conical section, forming an outer vortex flow pattern of the at least one plasma-forming gas.

Referring to FIGS. 7A to 8B, several alternative embodiments of the lower housing section 118 of the torch housing 210 are provided.

Figure 7B:
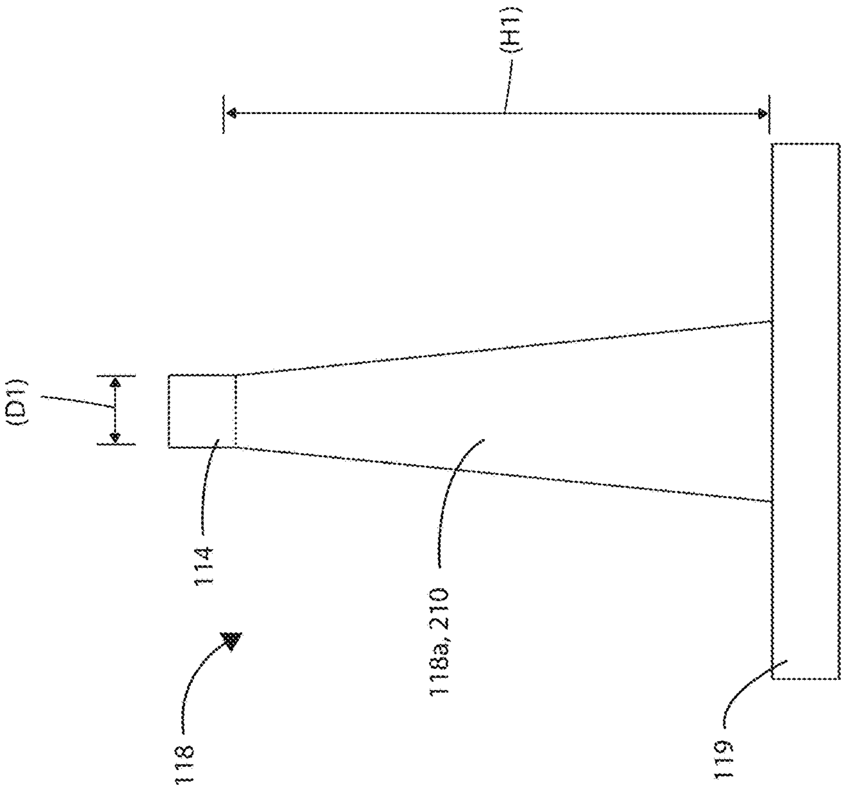
FIG. 7B shows a side view of an embodiment of the narrow configuration of the lower housing section of FIG. 2A.
Figure 7A:
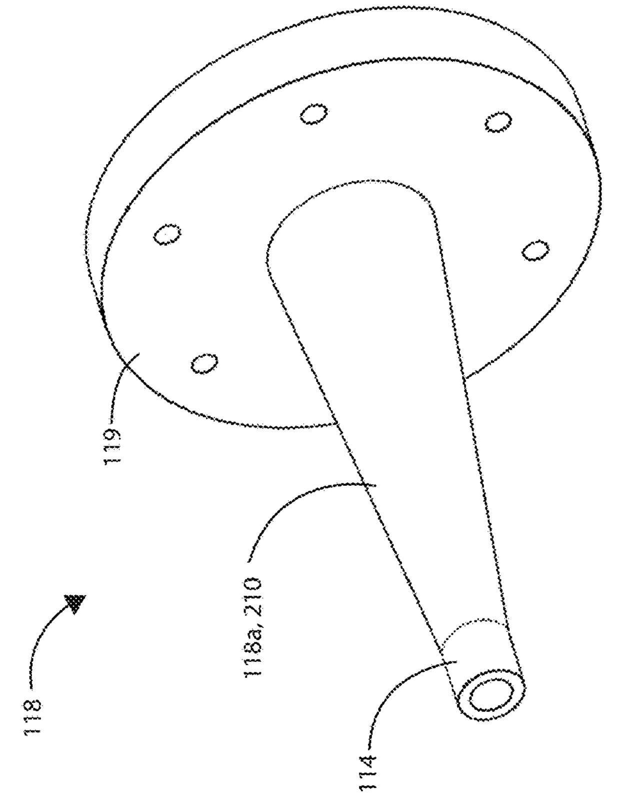
FIG. 7A shows a perspective view of an embodiment of a narrow configuration of the lower housing section of FIG. 2A.

FIGS. 7A and 7B provide a first, relatively narrow embodiment of the lower housing section 118 of the torch housing 210, where the torch housing 210 includes the conical chamber section 252 formed therewithin. In this exemplary embodiment, the lower housing section 118 includes the mounting plate 119 which includes a plurality of mounting apertures, as well as the hollow, conical lower housing body 118*a*, and a straight length that is the outlet of the microwave plasma torch. A distal diameter (D1) of the lower housing body 118*a* has a magnitude that is ¼ or less the magnitude of a height (H1) of the lower housing body 118*a*.

Figure 7D:
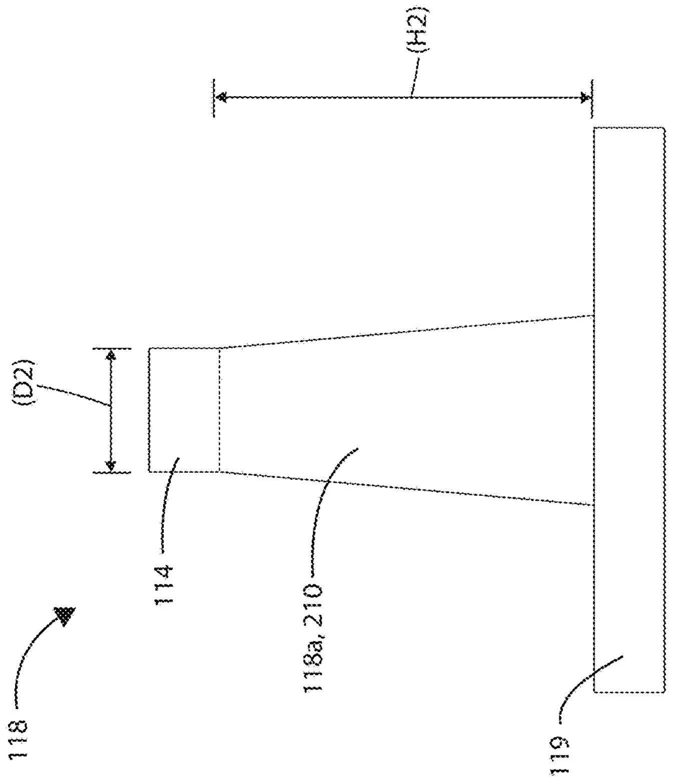
FIG. 7D shows a side view of an embodiment of the wide configuration of the lower housing section of FIG. 2A.
Figure 7C:
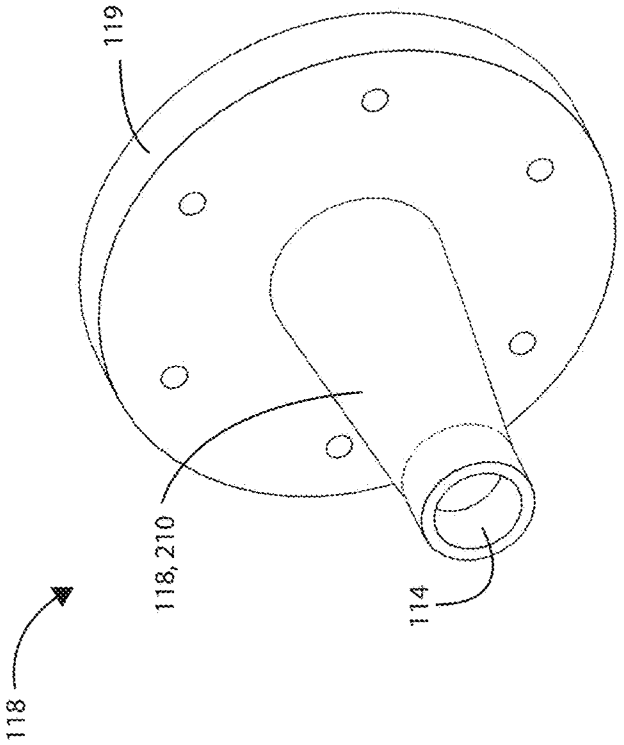
FIG. 7C shows a perspective view of an embodiment of a wide configuration of the lower housing section of FIG. 2A.

FIGS. 7C and 7D provide a second embodiment of the lower housing section 118 of the torch housing 210, where the torch housing 210 includes the conical chamber section 252 formed therewithin. In this exemplary embodiment, the lower housing section 118 includes the mounting plate that has a plurality of mounting apertures, as well as the hollow, conical lower housing body 118*a*, and a straight outlet portion. A height (H2) of the lower housing body 118*a* has a magnitude that is at least twice as large as a distal diameter (D2) of the lower housing body.

In an embodiment of the microwave plasma torch 200 of the present disclosure, the flow of plasma within the microwave plasma torch 200 is effectively generated in a two-step process. The first step in the process involves the generation of the plurality of plasma streamers 180. Once the plurality of plasma streamers 180 are reliable being generated within the torch chamber 220, a flow rate of the at least one plasma-forming gas into the at least one gas inlet 112 of the torch housing 210 is increased, thereby increase the high energy electron density within the torch chamber 220 and initiating the formation of the flow of plasma.

Based on the above description regarding the method of generating the flow of plasma, it can be said that method for generating a flow of plasma within the microwave plasma torch 200 of the present disclosure comprises a step of injecting the at least one plasma-forming gas into the torch chamber 220 of the microwave plasma torch 200 such that a vortex flow of the at least one plasma-forming gas is produced within the torch chamber 220, where the at least one plasma-forming gas being injected at a first flow rate. The method for generating a flow of plasma within the microwave plasma torch 200 also includes the steps of energizing the at least one conductive rod 140 that is mounted within the torch chamber 220 for generating the plurality of plasma streamers 180, the at least one conductive rod 140 being energized for at least partially ionizing the at least one plasma-forming gas, and injecting the at least one plasma-forming gas into the torch chamber 220 at a second flow rate that is greater than the first flow rate, where the injection of the at least one plasma-forming gas at the second flow rate drives the formation of the flow of plasma from the at least one plasma-forming gas and the plurality of plasma streamers 180 by providing additional at least one plasma-forming gas that can be further ionized by the plurality of plasma streamers 180.

In an embodiment of the method for generating a flow of plasma within the microwave plasma torch, the at least one conductive rod 140 is energized via at least one microwave signal and at least one electromagnetic field.

In an exemplary embodiment, the first flow rate is set at 1.4 SLPM, and after the ignition of the plurality of plasma streamers 180, the flow rate is increased to a particular working flow rate, where the working flow rate is set based on the particular characteristics of the microwave plasma torch 100.

In an alternate, exemplary embodiment, the microwave plasma torch 100 includes the embodiment of the lower housing section 118 shown in FIG. 7A and the first flow rate is set at 1.4 SLPM. When the ignition of the plurality of plasma streamers 180, the flow rate is increase to the working flow rate set at 37 SLPM. In yet another exemplary embodiment, the microwave plasma torch 100 includes the embodiment of the lower housing section 118 shown in FIG. 7C and the first flow rate is set at 1.4 SLPM. Upon the ignition of the plurality of plasma streamers 180, the flow rate is increase to the working flow rate set at 31 SLPM.

Figure 6:
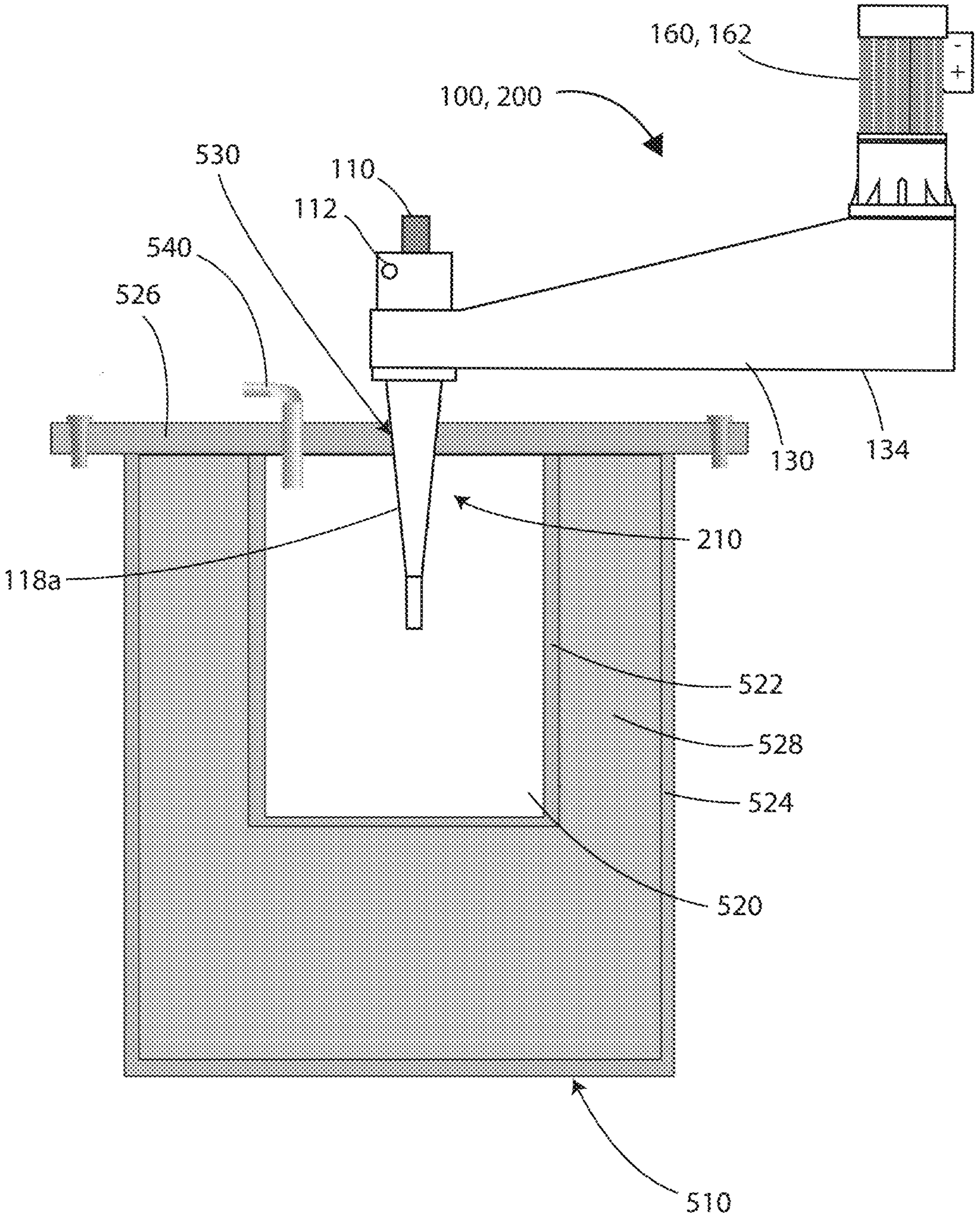
FIG. 6 shows a schematic of the embodiment of the microwave plasma torch of FIG. 2A, where the lower torch section is mounted in a reactor chamber for performing pyrolysis via the microwave plasma torch and extracting a gas.

In an embodiment such as shown in FIG. 6, the microwave plasma torch 100, 200 of the present disclosure is incorporated as part of a larger plasma-based, pyrolysis and gasification reactor that is designed for the treatment of various types of waste (including municipal solid waste). The microwave plasma torch 100, 200 is incorporated within the gasification reactor for producing at least one hydrocarbon-containing gas from a supply of waste that is fed into the reactor.

In the embodiment provided in FIG. 6, the pyrolysis and gasification reactor into which the microwave plasma torch 100, 200 is incorporated includes a reactor unit housing 510 that defines a reactor chamber 520 therewithin. The reactor unit housing 510 and reactor chamber 520 may have a variety of suitable forms and shapes. A form of the reactor chamber 520 may correspond to an overall form of the reactor unit housing 510 or may have a substantially different form to the overall form of the reactor unit housing 510.

In the specific embodiment provided in FIG. 6, the reactor unit housing 510 has a form with a substantially rectangular cross-section and the reactor chamber 520 has a similar cross-sectional form. The reactor unit housing 510 includes in outer reactor wall 524, and inner reactor wall 522 that defines an outermost extent of the reactor chamber 520, and a refractory layer 528 that is disposed between the outer reactor wall 524 and inner reactor wall 522. The reactor unit housing 510 also includes a top sealing plate 526 that closes off a top end of the reactor chamber 520. The top sealing plate 526 is removable mounted to the inner reactor wall 522 and outer reactor wall 524 of the reactor unit housing 510. The top sealing plate 526 includes a receiving aperture 530 that extends through the top sealing plate 526. The receiving aperture 530 is sized to removably receive a length of the microwave plasma torch 100, 200 therethrough such that the outlet of the microwave plasma torch 100, 200 is disposed within the reactor chamber 520. The top sealing plate 526 also includes a gas outlet conduit 540 that is mounted through the top sealing plate 526. The gas outlet conduit 540 is in fluid communication with the reactor chamber 520 for extracting one or more gases from the reactor chamber 520.

In using the pyrolysis and gasification reactor and microwave plasma torch 100, 200 to pyrolyze a supply of waste, a volume of the supply of waste is loaded into the reactor chamber 520 of the reactor unit housing 510. The microwave plasma troch 100, 200 is then powered to apply a stream of plasma to the supply of waste at a suitable temperature. In some embodiments, the specific value of this suitable temperature may be determined based at least in part on the contents of the supply of waste. The application of the stream of plasma from the microwave plasma torch 100, 200 produces a volume of at least one useful product gas, where the at least one useful product gas can be extracted from the reactor chamber 520 via the gas outlet conduit 540 for further processing and/or purification.

Figure 9A:
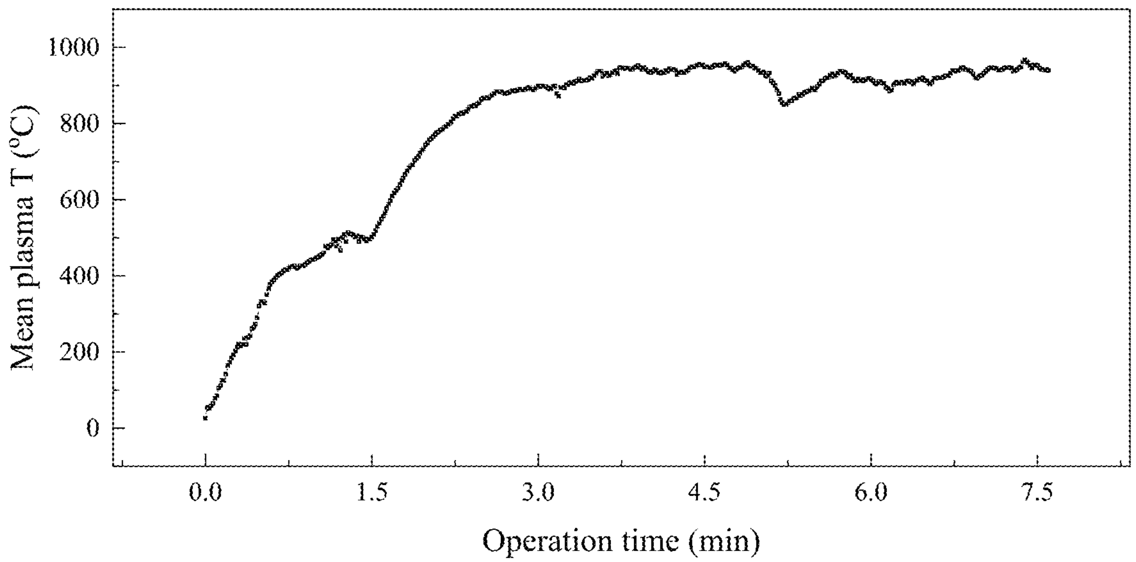
FIG. 9A is a plot of a mean temperature of the flow of plasma produced by the microwave plasma torch.
Figure 9B:
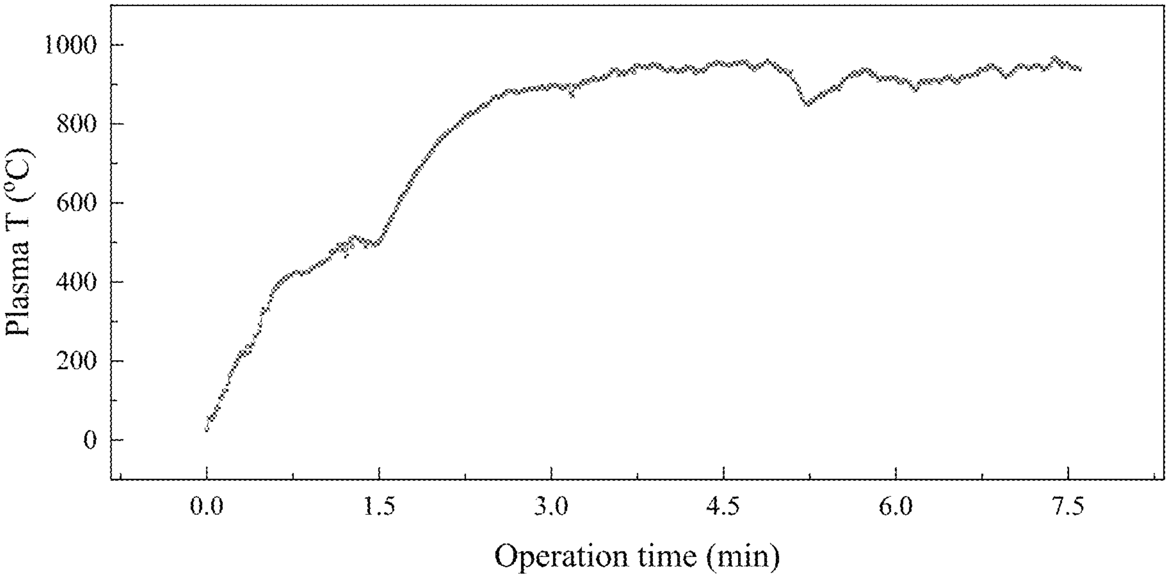
FIG. 9B is a plot of an actual temperature of the flow of plasma produced by the microwave plasma torch.

It is well established that, to adequately pyrolyze a volume of municipal solid waste, the plasma that is applied to the supply of municipal solid waste should have a stable plasma temperatures of up to 800 degrees Celsius. Referring to FIGS. 9A and 9B, there is provided a pair of plots of the characteristics of the flow of plasma generated by the microwave plasma torch 100 that demonstrate the ability of the microwave plasma torch 100 to achieve the required stable plasma temperature. The plots provided in FIGS. 9A and 9B are plots of the mean plasma temperature and plasma temperature as measured by an S-type thermocouple (set to acquire once per second measurements), where the measurement control was performed using LabVIEW™ software. In the specific embodiment shown in the plots, the flow rate of the at least one plasma-forming gas was set at 3.3 SLPM. The plasma temperature reaches a stable temperature of 950 degrees Celsius, and it takes approximately 3 minutes for the flow of plasma to reach the stable temperature. The plot provided in FIG. 9A demonstrates that the mean temperature measurement values do not vary from the temperature values, further indicating the stability of the flow of plasma generated by the microwave plasma torch 100. These temperature measurements indicate that the microwave plasma torch 100 is stable and can work in pyrolysis applications for different materials. The maximum pyrolysis temperature needed for this application is 800 degrees Celsius.

Figure 10:
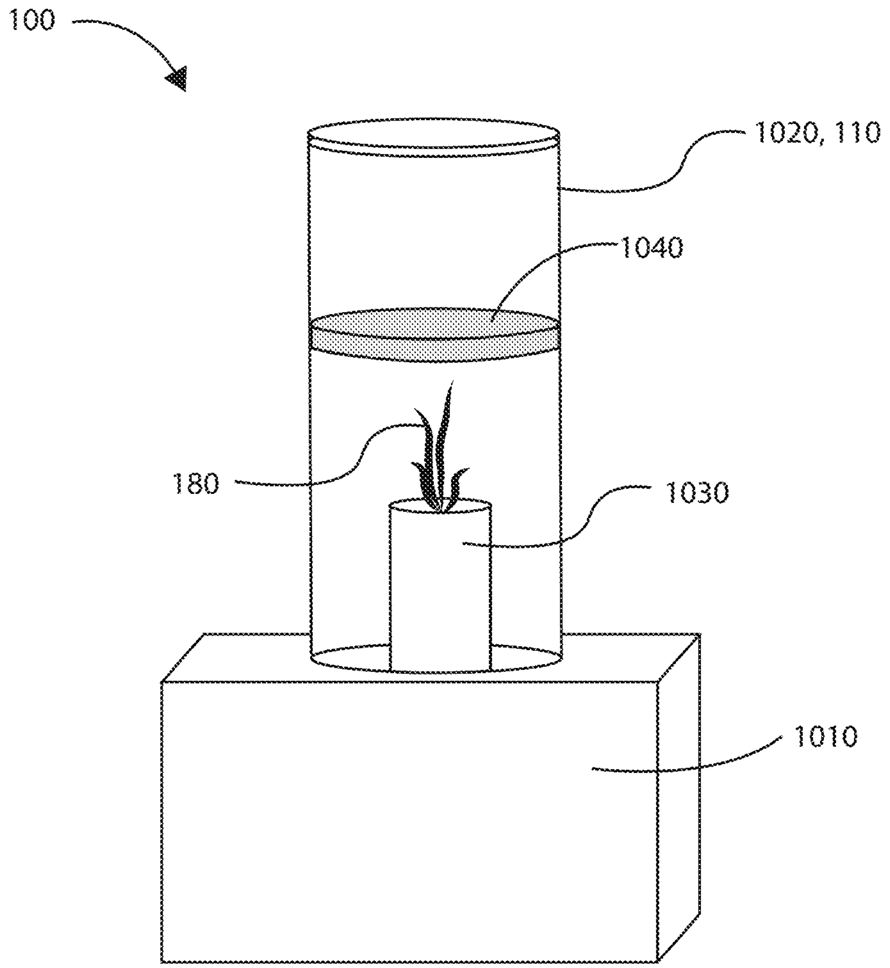
FIG. 10 shows an additional embodiment of the microwave plasma torch of FIG. 1A that includes an apparatus housing.

Referring to FIG. 10, there is provided an exemplary embodiment of the torch housing 110 and torch chamber 120 of the microwave plasma torch 100 disclosed herein. In this embodiment, the microwave generator 160 is a magnetron 162, and the magnetron 162 and waveguide housing 130 connected between the magnetron 162 and the torch housing 110 are both contained within an apparatus housing 1010. An aperture (not shown) is provided in the top of the apparatus housing 1010, and the torch housing 110 is mounted within the aperture and extends out the aperture to define the upper housing section 116.

In this exemplary embodiment, the upper housing section 116 includes a cylindrical outer housing body 1020, a length of a hollow dielectric tube 1030 that is concentrically mounted within cylindrical outer housing body 1020, and a frit 1040 that is mounted above the hollow dielectric tube 1030 and expands across a hollow interior of the cylindrical outer housing body 1020. The upper housing section 116 is positioned relative to the rest of the torch housing 110 such that the tip 142 of the at least one conductive rod 140 is disposed within the hollow dielectric tube 1030, where the plurality of plasma streamers 180 are generated between the tip 142 of the at least one conductive rod 140 such that the flow of plasma is produced within and expelled from an open end of the hollow dielectric tube 530.

In the specific embodiment provided in FIG. 10, the cylindrical outer length of the housing is entirely composed of quartz and has a length of at least 55 mm, an outer diameter of at least 36 mm and a wall thickness of at least 3 mm. The hollow dielectric tube 1030 is similarly composed of quartz, and has a length of at least 25 mm, an outer diameter of at least 32 mm and a thickness of at least 2 mm, and the frit 540 is a fine-to-medium porosity frit with a porosity in a range from 16 to 40 microns.

Figure 11:
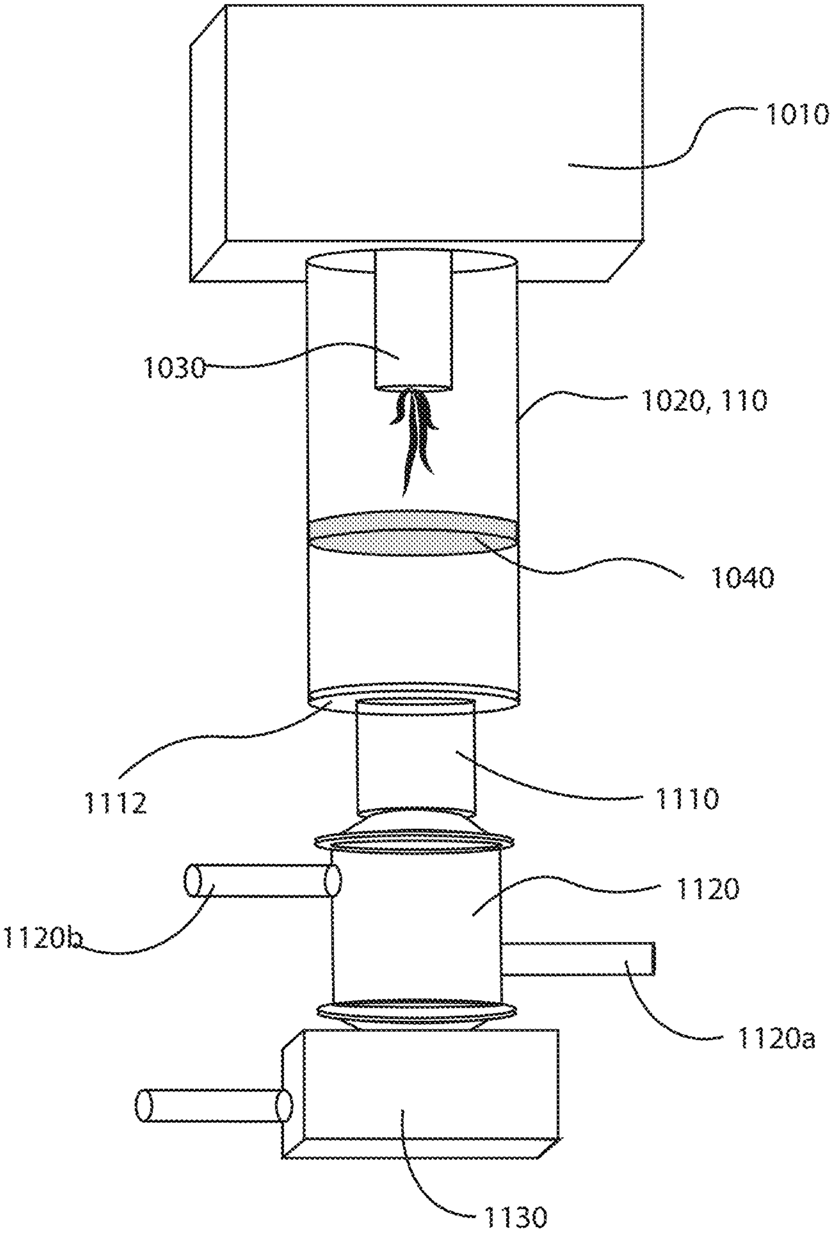
FIG. 11 shows an additional embodiment of the microwave plasma torch of FIG. 1A, where the microwave plasma torch is integrated with a reactor unit for pyrolyzing and extracting useful products from a supply of waste.

Referring to FIG. 11, there is provided an additional embodiment of the embodiment of the microwave plasma torch 100 provided in FIG. 10. As provided above with respect to this embodiment of the microwave plasma torch, the upper housing section 116 of the torch housing 110 includes the apparatus housing 1010, cylindrical outer housing body 1020, the length of a hollow dielectric tube 530 and the frit 1040 that is mounted above the hollow dielectric tube 1030 within the cylindrical outer housing body 1020. The microwave plasma torch 100 further includes a length of connector housing 610 that extends between a top end of the cylindrical outer housing body 1020 and a condenser 1120. The condenser 1120 includes an inlet 1120*a* and an outlet 1120*b* for the circulation therethrough of at least one working fluid. The condenser 1120 is in fluid connection with the outlet of the length of connector housing 1110, and a liquid fuel container 1130. In operation, a volume of municipal solid waste is pyrolyzed via the microwave plasma torch 100 to produce a volume of the at least one hydrocarbon-containing gas. The at least one hydrocarbon-containing gas flows through the upper end of the cylindrical outer housing body 1020, through the length of connector housing 1110, and into the condenser 1120, where the at least one hydrocarbon-containing gas is condensed to form at least one at hydrocarbon-containing liquid fuel. The at least one at hydrocarbon-containing liquid fuel is then collected in the liquid fuel container 1130.

In the specific embodiment provided in FIG. 11, the microwave plasma torch 100 is mounted in an inverted configuration such that the upper housing section 116 extends down from the apparatus housing 1010. The length of connector housing 1110 is a hollow, cylindrical length of quartz material with a flat O-ring connector formed on the end of the length of connector housing 1110 that is attached to the end of the cylindrical outer housing body 1020.

The above-described embodiments are intended to be examples of the present disclosure and alterations and modifications may be affected thereto, by those of skill in the art, without departing from the scope of the disclosure that is defined solely by the claims appended hereto.

PART NUMBERS

100 microwave plasma torch
110 torch housing
110*a* length of torch housing
112 gas inlet
116 upper housing section
116*a* first upper housing length
116*b* second upper housing length
118 lower housing section
118*a* lower housing body
119 mounting plate
120 torch chamber
122 upper chamber section
122*a* first upper section

122*b* second upper section
124 lower chamber section
130 waveguide housing
130*a* first end of waveguide housing
130*b* second end of waveguide housing
132 waveguide top wall
134 waveguide side walls
136 bottom walls
140 conductive rod
142 tip of conductive rod
160 microwave generator
162 magnetron
170 discharge portion
180 plasma streamers
200 microwave plasma torch
210 torch housing
220 torch chamber
238 pair of apertures
240 through channel
250 cylindrical chamber section
250*a* first cylindrical chamber section
250*b* second cylindrical chamber section
252 conical chamber section
510 reactor unit housing
520 reactor chamber
522 inner reactor wall
524 outer reactor wall
526 top sealing plate
528 refractory layer
530 receiving aperture
540 gas outlet conduit
810 extended cylindrical housing
820 tapering housing section
1010 apparatus housing
1020 cylindrical outer housing body
1030 hollow dielectric tube
1040 frit
1110 length of connector housing
1112 flat O-ring connector
1120 condenser
1120*a* inlet of the condenser
1120*b* outlet of the condenser
1130 liquid fuel container

What is claimed is:

1. A microwave plasma torch comprising:

a torch housing that defines a torch chamber therewithin, and that includes at least one inlet that is positioned for injecting at least one plasma-forming gas along an inner wall of the torch chamber, tangential to the inner wall of the torch chamber, the torch chamber including at least one cylindrical chamber section and a conical chamber section extending from the at least one cylindrical chamber section, the conical chamber section being shaped to accelerate a flow of the at least one plasma-forming gas along a length thereof for producing a vortex flow pattern of the at least one plasma-forming gas within the torch chamber;

a microwave generator for generating a microwave signal and an electromagnetic field;

at least one conductive rod that is disposed within the torch chamber; and a waveguide housing including a first waveguide end that is connected to the microwave generator and a second waveguide end that is connected to the torch housing, the waveguide housing being shaped to direct the electromagnetic field and the microwave signal from the microwave generator into the torch chamber for energizing the at least one conductive rod;

wherein the at least one conductive rod is mounted within the torch chamber such that the at least one conductive rod is within a path of the electromagnetic field as the electromagnetic field is directed into the torch chamber;

wherein the at least one conductive rod is energized via the electromagnetic field for applying a charge to the at least one plasma-forming gas for generating a plurality of plasma streamers from the at least one plasma-forming gas; and wherein the plurality of plasma streamers generated from the at least one plasma-forming gas are structured as a plurality of ionization fronts of the at least one plasma forming gas which further ionize the at least one plasma-forming gas to generate a plasma stream therefrom.

2. The microwave plasma torch of claim 1, wherein the inner wall of the torch chamber along which the at least one plasma-forming gas is injected is an inner wall of the at least one cylindrical chamber section.

3. The microwave plasma torch of claim 2, wherein the at least one cylindrical chamber section includes a first cylindrical chamber section and a second cylindrical chamber section disposed between the first cylindrical chamber section and the conical chamber section, and wherein a diameter of the first cylindrical chamber section is less than a diameter of the second cylindrical chamber section.

4. The microwave plasma torch of claim 3, wherein the at least one gas inlet is positioned within the torch housing such that the at least one plasma-forming gas is injected into the first cylindrical chamber section of the at least one cylindrical chamber section.

5. The microwave plasma torch of claim 4, wherein the second waveguide end surrounds a portion of the torch housing.

6. The microwave plasma torch of claim 5, wherein the portion of the torch housing that is surrounded by the second waveguide end is the second cylindrical chamber section.

7. The microwave plasma torch of claim 6, wherein the conical chamber section is formed with a taper such that a diameter of the conical chamber section adjacent the at least one cylindrical chamber section is greater than a diameter of the conical chamber section adjacent an outlet of the torch housing.

8. The microwave plasma torch of claim 7, wherein the conductive rod includes a conductive rod tip, and wherein the conductive rod is positioned within the torch chamber such that the conductive rod tip is disposed within the at least one cylindrical chamber section.

9. The microwave plasma torch of claim 8, wherein a long axis of the conductive rod is aligned to be parallel to an electric field portion of the electromagnetic field within the torch chamber.

10. The microwave plasma torch of claim 1, wherein the torch housing is composed of at least one dielectric material.

11. The microwave plasma torch of claim 1, wherein the microwave generator is any one of a magnetron and a solid-state power amplifier (SSPA).

12. A microwave plasma torch comprising:

a torch housing that defines a torch chamber therewithin, and that includes at least one gas inlet for the injection of at least one plasma forming gas and an outlet for expelling a plasma stream generated from the at least one plasma-forming gas;

a conductive rod that is mounted within the torch chamber such that a tip of the conductive rod is disposed within a discharge portion of the torch chamber;

a microwave generator for generating an electromagnetic field and a microwave signal; and a waveguide housing including a first waveguide end that is connected to the microwave generator and a second waveguide end which surrounds a length of the torch housing that includes the discharge portion of the torch chamber, the waveguide housing being shaped to direct the electromagnetic field and the microwave signal from the microwave generator to the torch chamber within the torch housing for energizing the at least one conductive rod;

wherein the at least one conductive rod is mounted within the torch chamber such that the at least one conductive rod is within a path of the electromagnetic field as the electromagnetic field is directed into the torch chamber;

wherein the energizing of the at least one conductive rod ionizes the at least one plasma-forming gas to drive the formation of a plurality of plasma streamers within the torch chamber; and wherein the plurality of plasma streamers are structured as a plurality of ionization fronts of the at least one plasma forming gas which further ionize the at least one plasma-forming gas to generate a flow of plasma therefrom.

13. The microwave plasma torch of claim 12, wherein the inner wall of the torch chamber along which the at least one plasma-forming gas is injected is an inner wall of the discharge portion.

14. The microwave plasma torch of claim 13, wherein the waveguide housing is composed of any one of a plastic material, a metal material with a low bulk resistivity, and a metal material with low conductivity characteristics.

15. The microwave plasma torch of claim 12, wherein the torch housing is at least partially composed of at least one dielectric material.

16. The microwave plasma torch of claim 15, wherein the torch chamber includes at least one cylindrical chamber section and a conical chamber section extending between the at least one cylindrical chamber section and the outlet of the torch chamber and wherein the discharge portion is formed within the at least one cylindrical chamber section, and the at least one conductive rod is concentrically mounted within the at least one cylindrical chamber section.

17. The microwave plasma torch of claim 16, wherein the at least one conductive rod includes a conductive rod tip, and wherein the at least one conductive rod is positioned within the torch chamber such that the conductive rod tip is disposed within the at least one cylindrical chamber section.

18. The microwave plasma torch of claim 17 wherein a long axis of the at least one conductive rod is aligned to be parallel to an electric field portion of the electromagnetic field within the torch chamber.

19. The microwave plasma torch of claim 15, wherein the chamber includes at least one cylindrical chamber section and a conical chamber section extending between the at least one cylindrical chamber section and the outlet of the torch chamber, and wherein the conical chamber section is shaped to accelerate a flow of the at least one plasma-forming gas along a length thereof for producing a vortex flow of the at least one plasma-forming gas within the torch chamber.

20. The microwave plasma torch of claim 19, wherein the conical chamber section is shaped with a taper such that a diameter of the conical chamber section adjacent the at least one cylindrical chamber section is greater than a diameter of the conical chamber section adjacent the outlet of the torch housing.

21. The microwave plasma torch of claim 12, wherein the microwave generator is any one of a magnetron and a solid-state power amplifier (SSPA).

* * * * *